(12) United States Patent
Watanabe et al.

(10) Patent No.: US 9,287,561 B2
(45) Date of Patent: Mar. 15, 2016

(54) NEGATIVE ELECTRODE MATERIAL FOR NON-AQUEOUS ELECTROLYTE SECONDARY BATTERIES, MANUFACTURING METHOD THEREFOR, AND LITHIUM-ION SECONDARY BATTERIES

(75) Inventors: Koichiro Watanabe, Annaka (JP);
Tetsuo Nakanishi, Annaka (JP);
Kazuyuki Taniguchi, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 709 days.

(21) Appl. No.: 12/896,249

(22) Filed: Oct. 1, 2010

(65) Prior Publication Data

US 2011/0097627 A1    Apr. 28, 2011

(30) Foreign Application Priority Data

Oct. 28, 2009    (JP) ................... 2009-247922

(51) Int. Cl.
 *H01M 4/62* (2006.01)
 *H01M 4/38* (2006.01)
 *B82Y 30/00* (2011.01)

(52) U.S. Cl.
 CPC .............. *H01M 4/38* (2013.01); *B82Y 30/00* (2013.01); *H01M 4/62* (2013.01)

(58) Field of Classification Search
 None
 See application file for complete search history.

(56) References Cited

U.S. PATENT DOCUMENTS

| 5,395,711 | A | 3/1995 | Tahara et al. | |
| 6,638,662 | B2 | 10/2003 | Kaneda et al. | |
| 7,037,581 | B2* | 5/2006 | Aramata et al. | 428/402 |
| 2003/0215711 | A1 | 11/2003 | Aramata et al. | |
| 2006/0147797 | A1* | 7/2006 | Wu et al. | 429/218.1 |
| 2009/0061303 | A1 | 3/2009 | Inagaki et al. | |
| 2009/0197179 | A1* | 8/2009 | Wakita et al. | 429/232 |

FOREIGN PATENT DOCUMENTS

| CN | 1513922 A | 7/2004 |
| CN | 1855586 A | 11/2006 |
| JP | A-11-283668 | 10/1999 |
| JP | B2-2997741 | 1/2000 |
| JP | A-2000-138075 | 5/2000 |
| JP | A-2000-243396 | 9/2000 |
| JP | A-2002-042806 | 2/2002 |
| JP | A-2003-100296 | 4/2003 |
| JP | A-2004-047404 | 2/2004 |

(Continued)

OTHER PUBLICATIONS

Machine translation of JP 2009-135094.*
Notification of Reasons for Refusal issued in Japanese Application No. 2009-247922 Issued Feb. 21, 2012 (with partial trans.).
Aug. 28, 2012 Office Action Issued in Japanese Patent Application No. 2009-247922 (with partial translation).

(Continued)

*Primary Examiner* — Maria J Laios
(74) *Attorney, Agent, or Firm* — Oliff PLC

(57) ABSTRACT

The present invention is a negative electrode material for non-aqueous electrolyte secondary batteries, comprising at least: particles wherein silicon nanoparticles are dispersed in silicon oxide (silicon oxide particles); and a metal oxide coating formed on a surface of the silicon oxide particles. As a result, there is provided a negative electrode material for non-aqueous electrolyte secondary batteries that enables the production of a negative electrode suitable for lithium-ion secondary batteries and the like that provides improved safety and cycle performance over conventional negative electrode materials.

3 Claims, 1 Drawing Sheet

(56) References Cited

FOREIGN PATENT DOCUMENTS

| JP | A-2005-149957 | 6/2005 |
| JP | A-2006-190642 | 7/2006 |
| JP | B2-4056123 | 3/2008 |
| JP | A-2009-054319 | 3/2009 |
| JP | A-2009-135094 | 6/2009 |

OTHER PUBLICATIONS

Jan. 6, 2014 The 1$^{st}$ Office Action issued in Chinese Application No. 201010527952.0 with partial English-language translation.

Aug. 14, 2014 Office Action issued in Chinese Patent Application No. 201010527952.0 (with translation).

* cited by examiner

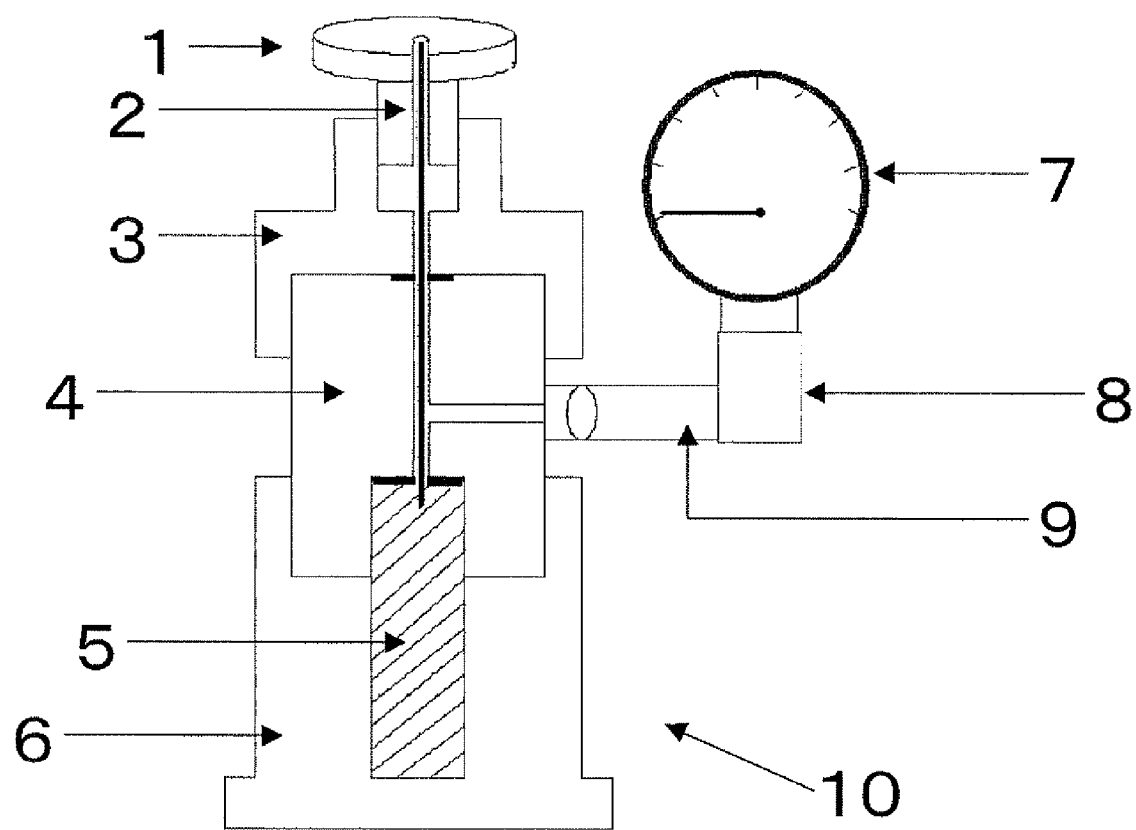

NEGATIVE ELECTRODE MATERIAL FOR NON-AQUEOUS ELECTROLYTE SECONDARY BATTERIES, MANUFACTURING METHOD THEREFOR, AND LITHIUM-ION SECONDARY BATTERIES

FIELD OF THE INVENTION

The present invention relates to a negative electrode material for non-aqueous electrolyte secondary batteries that provides satisfactory safety and cycle performance when used as a negative electrode active material for lithium-ion secondary batteries, a method for manufacturing the negative electrode material, and lithium-ion secondary batteries.

DESCRIPTION OF THE RELATED ART

With the recent remarkable development in portable electronic equipment, communication equipment, and the like, secondary batteries having high energy density are strongly desired from the viewpoints of economic efficiency, and making the equipment smaller and lighter.

Examples of methods for meeting this demand include methods wherein silicon oxide is used as a negative electrode material (see, e.g., Japanese Patent No. 2997741); and methods wherein a surface of silicon oxide particles is coated with a carbon layer by chemical vapor deposition (see, e.g., Japanese Unexamined Patent Publication No. 2002-42806).

However, these conventional methods are not necessarily satisfactory in that, although the charge/discharge capacity can be increased to increase the energy density, cycle performance are unsatisfactory, and characteristics demanded by the market are not yet satisfactory. Therefore, there has been a desire that the energy density be further improved.

In particular, according to the method disclosed in Japanese Patent No. 2997741, a negative electrode with high capacity is obtained using silicon oxide as a negative electrode material for lithium-ion secondary batteries. However, to the present inventors' knowledge, the method still has room for improvement, because irreversible capacity during the initial charge and discharge is high, and cycle performance have not reached a level for practical use.

According to a technique wherein a conductivity is imparted to a negative electrode material (see, e.g., Japanese Unexamined Patent Publication No. 2002-42806 and Japanese Unexamined Patent Publication No. 2000-243396), a uniform carbon coating is not formed because the technique involves fusion between solids, and hence, sufficient conductivity is not obtained. Further, according to the methods disclosed in Japanese Unexamined Patent Publication No. 2002-42806 and Japanese Unexamined Patent Publication No. 2000-243396, the deposition of fine silicon crystals, the structure of a carbon coating, and the fusion between the carbon coating and substrate are unsatisfactory. Therefore, although the cycle performance have been improved, the capacity gradually decreases as the number of charge/discharge cycles increases, and, after a certain number of cycles, the capacity abruptly decreases. Thus, the negative electrode materials obtained by these methods are still unsatisfactory for use in secondary batteries.

Furthermore, it is known that chained carbonic acid ester and cyclic carbonic acid ester, which are often used as electrolytes in lithium-ion secondary batteries, are susceptible to electrolysis especially in the vicinity of electrodes, and hence, become a cause of gas generation. Measures need to be taken to prevent such gas generation because it may cause battery deformation or degradation in battery characteristics. In the case of silicon oxide with increased capacity, safety measures are required even more than conventional carbonaceous materials.

As a method for suppressing the gas generation, Japanese Unexamined Patent Publication No. 2000-138075 reports a method wherein a composite oxide represented by $LiCo_{1-x}Nb_xO_2$ ($0.00001 \leq x \leq 0.05$) is used as the positive electrode active material. Moreover, Japanese Patent No. 4056123 reports a method wherein $Li_N(CnF_{2n+1}SO_2)_2$ (n is 2, 3, or 4) is added to an electrolyte, and Japanese Unexamined Patent Publication No. 2009-54319 reports a method wherein an organic compound having an isocyanate group is added as an additive to an electrolyte. Thus, a number of measures have been reported concerning various battery-constituting materials.

With respect to negative electrode active materials, however, sufficient measures for reducing gas generation have not been taken yet.

SUMMARY OF THE INVENTION

The present invention has been made in view of the above mentioned problems. An object of the invention is to provide a negative electrode material for non-aqueous electrolyte secondary batteries that enables the production of a negative electrode suitable for lithium-ion secondary batteries and the like that provides improved safety and cycle performance over conventional negative electrode materials; a method for manufacturing the negative electrode material; and lithium-ion secondary batteries.

In order to solve above-mentioned problems, present invention provides a negative electrode material for non-aqueous electrolyte secondary batteries, comprising at least, particles wherein silicon nanoparticles are dispersed in silicon oxide (silicon oxide particles); and a metal oxide coating formed on a surface of the silicon oxide particles.

Because the surface of the particles wherein silicon nanoparticles are dispersed in silicon oxide is coated with the metal oxide coating, the surface activity of the surface of the negative electrode material is reduced, thereby suppressing the decomposition of the electrolyte. Therefore, the amount of gas generated can be reduced, and the cycle performance can be improved. Moreover, problems such as battery fire and explosion can be prevented more effectively than conventionally. Hence, a negative electrode material for non-aqueous electrolyte secondary batteries having higher safety can be provided.

Furthermore, the negative electrode material is mostly composed of particles wherein silicon nanoparticles are dispersed in silicon oxide, and thus, provides increased capacity over conventional graphite materials and the like. Therefore, the negative electrode material is suitable for the production of non-aqueous electrolyte secondary batteries with increased capacity.

Preferably, the metal oxide coating comprises an oxide of one or more elements selected from the group consisting of magnesium (Mg), aluminum (Al), titanium (Ti), and silicon (Si).

When the metal oxide coating comprises an oxide of one or more elements selected from the above-mentioned elements, the surface activity of the negative electrode material can be more effectively reduced, and hence, the decomposition of the electrolyte can be more effectively suppressed.

Preferably, the metal oxide coating further comprises, as a constitutional element, at least one element selected from the group consisting of zirconium (Zr), hafnium (Hf), vanadium (V), niobium (Nb), tantalum (Ta), chromium (Cr), molybdenum (Mo), tungsten (W), manganese (Mn), iron (Fe), ruthenium (Ru), cobalt (Co), rhodium (Rh), iridium (Ir), nickel (Ni), palladium (Pd), cerium (Ce), indium (In), germanium (Ge), tin (Sn), bismuth (Bi), antimony (Sb), cadmium (Cd), copper (Cu), and silver (Ag).

When the metal oxide coating that further comprises the above-mentioned element(s) is formed in the negative electrode material for non-aqueous electrolyte secondary batteries, the decomposition of the electrolyte during charging and discharging can be further suppressed. This prevents degradation in cycle performance, and further reduces the amount of gas generated, thereby further reducing the risk of battery expansion and explosion.

Preferably, the metal oxide coating is formed on the silicon oxide particles in a proportion of 0.1% by mass or more and 30% by mass or less.

When the amount of the metal oxide coating is 0.1% by mass or more, the coating thickness is appropriately large and uniform, resulting in a negative electrode material for non-aqueous electrolyte secondary batteries that provides increased safety. When the amount of the metal oxide coating is 30% by mass or less, the proportion of the metal oxide, which is an inactive material, is not excessive, resulting in a negative electrode material that suppresses a decrease in battery capacity.

Preferably, the negative electrode material for non-aqueous electrolyte secondary batteries further comprises a carbon coating formed on a surface of the metal oxide coating.

When the silicon oxide particles further comprise the carbon coating formed on the surface of the metal oxide coating, the decomposition of the electrolyte on the surface is suppressed, and the surface conductivity is satisfactory. Hence, the resulting negative electrode material is suitable as a negative electrode for non-aqueous electrolyte secondary batteries that provides improved cycle performance.

Another aspect of the present invention provides a lithium-ion secondary battery comprising at least a positive electrode, a negative electrode, and a lithium-ion conducting non-aqueous electrolyte, the battery comprising, as the negative electrode, the negative electrode material for non-aqueous electrolyte secondary batteries described above.

As mentioned above, the negative electrode material of the present invention for non-aqueous electrolyte secondary batteries can provide improved safety and cycle performance over conventional negative electrode materials, when it is used as a negative electrode. Therefore, a lithium-ion secondary battery including, as the negative electrode, the negative electrode material of the present invention for non-aqueous electrolyte secondary batteries, also exhibits improved safety and cycle performance over conventional secondary batteries.

An another aspect of the present invention provides a method for manufacturing a negative electrode material for non-aqueous electrolyte secondary batteries, comprising at least hydrolyzing a metal alkoxide to form a metal oxide coating on a surface of particles wherein silicon nanoparticles are dispersed in silicon oxide (silicon oxide particles).

Because the metal oxide coating is formed on the silicon oxide particles (particles wherein silicon nanoparticles are dispersed in silicon oxide) having increased capacity over conventional graphite materials and the like, the decomposition of the electrolyte on the surface during charging and discharging can be suppressed when the negative electrode material is used as a negative electrode. Moreover, the risk of problems such as battery fire and explosion can be minimized. Thus, the invention provides a method for manufacturing a negative electrode material for non-aqueous electrolyte secondary batteries that provides increased safety, improved cycle performance, and increased capacity over conventional negative electrode materials.

Furthermore, the hydrolysis of a metal alkoxide enables a metal oxide coating having a uniform thickness to be easily formed on the surface of the silicon oxide particles. Therefore, an inexpensive method for manufacturing a negative electrode material can be provided without increasing manufacturing costs.

Preferably, the metal oxide coating comprises an oxide of one or more elements selected from the group consisting of magnesium (Mg), aluminum (Al), titanium (Ti), and silicon (Si).

When the oxide of one or more elements selected from Mg, Al, Ti, and Si is formed on the surface of the silicon oxide particles as the metal oxide coating, a negative electrode material that can further suppress, for example, the decomposition of the electrolyte during charging and discharging, can be produced.

Preferably, the metal oxide coating further comprises, as a constitutional element, at least one element selected from the group consisting of zirconium (Zr), hafnium (Hf), vanadium (V), niobium (Nb), tantalum (Ta), chromium (Cr), molybdenum (Mo), tungsten (W), manganese (Mn), iron (Fe), ruthenium (Ru), cobalt (Co), rhodium (Rh), iridium (Ir), nickel (Ni), palladium (Pd), cerium (Ce), indium (In), germanium (Ge), tin (Sn), bismuth (Bi), antimony (Sb), cadmium (Cd), copper (Cu), and silver (Ag).

When the metal oxide coating further comprises the above-mentioned element(s), the decomposition of the electrolyte during charging and discharging can be further suppressed, thereby further preventing degradation in cycle performance. Moreover, the amount of gas generated can be further reduced, thereby further reducing the risk of battery expansion and explosion.

Preferably, the metal oxide coating is formed on the silicon oxide particles in a proportion of 0.1% by mass or more and 30% by mass or less.

When the amount of the metal oxide coating is 0.1% by mass or more, the coating thickness can be appropriately large and uniform, resulting in a negative electrode material for non-aqueous electrolyte secondary batteries that provides increased safety. When the amount of the metal oxide coating is 30% by mass or less, the proportion of the metal oxide, which is an inactive material, can be prevented from being excessive, thereby preventing a decrease in battery capacity.

Preferably, a carbon coating is further formed on a surface of the metal oxide coating.

When the carbon coating is further formed on the surface of the metal oxide coating, a negative electrode material suitable for non-aqueous electrolyte secondary batteries that can suppress the decomposition of the electrolyte on the surface during charging and discharging, has a satisfactory surface conductivity, and provides improved cycle performance, can be produced.

As described above, the negative electrode material of the present invention for non-aqueous electrolyte secondary batteries, in which the surface of the particles wherein silicon nanoparticles are dispersed in silicon oxide is coated with the metal oxide, is suitable as a negative electrode for non-aqueous electrolyte secondary batteries, such as lithium-ion secondary batteries, that provides improved safety and cycle performance. Moreover, the method of the invention for producing a negative electrode material for non-aqueous electrolyte secondary batteries is simple and sufficiently applicable to industrial-scale production, thereby making a great contribution to the production of inexpensive non-aqueous electrolyte secondary batteries.

BRIEF DESCRIPTION OF THE DRAWINGS

FIG. 1 is a schematic diagram showing the gas sampling case for cylindrical cells (actual cells) used in the Examples and Comparative Example.

DETAILED DESCRIPTION OF THE PREFERRED EMBODIMENTS

The present invention will be described in more detail below.

As described above, the development of a negative electrode material for non-aqueous electrolyte secondary batteries that enables the production of a negative electrode suitable for lithium-ion secondary batteries and the like that provides improved safety and cycle performance over conventional negative electrode materials, and a method for manufacturing the negative electrode material, has been waited.

Thus, the present inventors conducted extensive studies, and consequently found that, by using a negative electrode material for non-aqueous electrolyte secondary batteries in which the surface of particles wherein silicon nanoparticles are dispersed in silicon oxide is coated with a metal oxide, the presence of the metal oxide coating effectively prevents problems such as battery fire and explosion. The present inventors also found that the use of such a negative electrode material enables the surface activity to decrease, and the decomposition of the electrolyte to be suppressed, thereby improving the cycle performance. The invention has been accomplished based on these knowledge.

Hereinafter, embodiments of the present invention will be explained in detail, but the present invention is not restricted thereto.

The negative electrode material of the present invention for non-aqueous electrolyte secondary batteries comprises at least particles wherein silicon nanoparticles are dispersed in silicon oxide (silicon oxide particles); and a metal oxide coating formed on a surface of the silicon oxide particles.

In the negative electrode material in which the metal oxide coating is formed on the surface of the particles wherein high-capacity silicon nanoparticles are dispersed in silicon oxide, the metal oxide coating formed on the surface reduces the surface activity, thereby suppressing the decomposition of the electrolyte. Therefore, the amount of gas generated can be reduced, and the cycle performance can be improved. Moreover, problems such as battery fire and explosion can be prevented more effectively than conventionally. This results in a negative electrode material for non-aqueous electrolyte secondary batteries that provides increased safety and capacity.

The metal oxide coating may include an oxide of one or more elements selected from the group consisting of magnesium, aluminum, titanium, and silicon. The metal oxide coating may further include, as a constitutional element, at least one element selected from the group consisting of zirconium, hafnium, vanadium, niobium, tantalum, chromium, molybdenum, tungsten, manganese, iron, ruthenium, cobalt, rhodium, iridium, nickel, palladium, cerium, indium, germanium, tin, bismuth, antimony, cadmium, copper, and silver.

This enables the surface activity to be more effectively reduced than conventionally, and enables the decomposition of the electrolyte during charging and discharging to be more effectively suppressed, thereby further reducing the amount of gas generated. This results in a negative electrode material for non-aqueous electrolyte secondary batteries that further reduces degradation in cycle performance and the risk of battery expansion and explosion.

The metal oxide coating may be formed on the silicon oxide particles in a proportion of 0.1% by mass or more and 30% by mass or less.

When the amount of the metal oxide coating is 0.1% by mass or more based on the silicon oxide particles, the coating thickness can be sufficiently large and uniform, resulting in a negative electrode material for non-aqueous electrolyte secondary batteries that provides increased safety for the electrolytes. When the amount of the metal oxide coating is 30% by mass or less, the proportion of the metal oxide, which is an inactive material, is not excessive, resulting in a negative electrode that suppresses a decrease in battery capacity.

A carbon coating may further be formed on a surface of the metal oxide coating.

This suppresses the decomposition of the electrolyte on the surface, while making the surface conductivity satisfactory, resulting in a negative electrode material for non-aqueous electrolyte secondary batteries that provides further improved cycle performance.

Next, the method for producing a negative electrode material for non-aqueous electrolyte secondary batteries according to the present invention will be explained. However, the present invention is not of course restricted thereto.

The negative electrode material of the present invention for non-aqueous electrolyte secondary batteries can be obtained by, for example, hydrolyzing a metal alkoxide to coat particles wherein silicon nanoparticles are dispersed in silicon oxide (silicon oxide particles) with a metal oxide.

In order to coat the silicon oxide particles with a metal oxide by hydrolyzing a metal alkoxide, particles wherein silicon nanoparticles are dispersed in silicon oxide (silicon oxide particles), which are used as the raw material, are prepared first.

The raw material particles wherein silicon nanoparticles are dispersed in silicon oxide can be produced by, for example, a method wherein a mixture of fine particles of silicon and a silicon-based compound is fired; or by a method wherein particles of silicon oxide before disproportionation represented by the general formula, SiO, are heat-treated in an inert non-oxidative atmosphere, such as argon, at a temperature of 400° C. or more, preferably 800 to 1,100° C., thereby carrying out a disproportionation reaction.

In particular, the material produced by the latter method is preferable because fine crystals of silicon are uniformly dispersed. This disproportionation reaction can reduce the size of the silicon nanoparticles to 1 to 100 nm.

The term "silicon oxide" as used herein collectively refers to amorphous silicon oxides; however, the silicon oxide in the particles wherein silicon nanoparticles are dispersed in silicon oxide is preferably silicon dioxide. The silicon oxide before disproportionation is represented by the general formula, SiO. This silicon oxide can be obtained by cooling and depositing a silicon monoxide gas produced by heating a mixture of silicon dioxide and metal silicon. The state in which silicon nanoparticles (crystals) are dispersed in amorphous silicon oxide can be confirmed using a transmission electron microscope.

The physical properties of the particles of silicon oxide before disproportionation, and the particles wherein silicon nanoparticles are dispersed in silicon oxide (silicon oxide particles), can be suitably selected according to the intended composite particles, and hence, the general properties of these particles are not particularly limited.

However, the mean particle size of these particles is preferably 0.1 to 50 μm; preferably has a lower limit of 0.2 μm or more, and particularly preferably 0.5 μm or more; and preferably has an upper limit of 30 μm or less, and particularly preferably 20 μm or less. The definition of the term "mean particle size" as used herein is as follows: when a cumulative curve is determined taking the total volume of the particles as 100% using the laser diffraction/scattering particle size distribution measurement method, the mean particle size means the particle size D50 (median size) at the point where the cumulative curve is 50%.

The BET specific surface area of the particles of silicon oxide before disproportionation and the silicon oxide particles is preferably 0.5 to 100 m$^2$/g, and particularly preferably 1 to 20 m$^2$/g.

Next, a metal alkoxide solution is prepared, the previously prepared silicon oxide particles are suspended in the solution, and water is added thereto to hydrolyze the metal alkoxide, thereby forming a metal oxide coating on the silicon oxide particles. Here, it is necessary that the metal oxide coating does not impair the performance of a secondary battery.

The composition of the metal oxide coating is not particularly limited as long as it does not impair the performance of a secondary battery. The metal oxide coating may comprise an oxide of one or more elements selected from the group consisting of magnesium, aluminum, titanium, and silicon. An oxide of a single element or a composite oxide may be used as the oxide of these elements.

The metal oxide coating may further comprise, as a constitutional element, at least one element selected from the group consisting of zirconium, hafnium, vanadium, niobium, tantalum, chromium, molybdenum, tungsten, manganese, iron, ruthenium, cobalt, rhodium, iridium, nickel, palladium, cerium, indium, germanium, tin, bismuth, antimony, cadmium, copper, and silver.

By coating the silicon oxide particles with a metal oxide coating formed of the above-mentioned element(s), the decomposition of the electrolyte during charging and discharging can be further suppressed, thereby reducing degradation in cycle performance, as well as the amount of gas generated. In this way, the risk of battery expansion and explosion can be further reduced.

The proportion of the metal oxide on the surface may be 0.1% by mass or more and 30% by mass or less, based on the particles wherein silicon nanoparticles are dispersed in silicon oxide. The proportion of the metal oxide on the surface is more preferably 1% by mass or more and 20% by mass or less, and particularly preferably 1% by mass or more and 10% by mass or less.

A proportion of the metal oxide of 0.1% by mass or more can prevent the coating thickness from easily becoming small and non-uniform, thereby further reducing the risk of potential safety problems. A proportion of the metal oxide of 30% by mass or less can increase the proportion of the inactive material, thereby eliminating any disadvantage for a high-capacity battery due to a decrease in battery capacity.

After the formation of the metal oxide coating, a carbon coating may further be formed in order to impart a conductivity to the surface of the metal oxide coating. Note, however, that methods for imparting a conductivity also include a method wherein conductive particles such as carbon are mixed; vapor deposition of carbon; and the combination thereof.

A preferred method for forming a carbon coating is a method wherein the silicon oxide particles coated with the metal oxide coating are subjected to chemical vapor deposition (CVD) in an organic gas. This method can be efficiently performed by introducing an organic gas into a reactor during heat treatment.

Specifically, a carbon coating can be obtained by subjecting the silicon oxide particles coated with the metal oxide coating obtained above to chemical vapor deposition in an organic gas at a reduced pressure of 50 to 30,000 Pa, and at a temperature of 700 to 1,200° C. The pressure is preferably 50 to 10,000 Pa, and more preferably 50 to 2,000 Pa. The temperature of chemical vapor deposition is preferably 800 to 1,200° C., and more preferably 900 to 1,100° C.

The treatment time can be suitably selected according to the intended amount of carbon coating, the treatment temperature, the concentration (flow rate) of the organic gas, the amount of the organic gas introduced, and the like. Typically, a treatment time of 1 to 10 hours, and, in particular, about 2 to about 7 hours, is economically efficient.

A pressure of 30,000 Pa or less during chemical vapor deposition can prevent the proportion of a graphite material having a graphite structure from becoming excessive, thereby minimizing the risk of degradation in cycle performance, in addition to a decrease in battery capacity, when the resulting material is used as a negative electrode material for non-aqueous electrolyte secondary batteries.

Moreover, a treatment temperature of 800° C. or more can eliminate the need for long-hour treatment, thereby increasing the productivity. A treatment temperature of 1,200° C. or less can also reliably reduce the possibility of fusion and aggregation of particles during the chemical vapor deposition treatment, thereby it can be prevented a condition where a conductive coating is not formed due to an aggregated surface. This ensures that the cycle performance can be improved when the resulting material is used as a negative electrode material for non-aqueous electrolyte secondary batteries.

An organic material capable of pyrolysis, particularly in a non-oxidative atmosphere, at the above-mentioned heat-treatment temperatures to produce carbon (graphite), is selected as the organic material used as a raw material that generates an organic gas in the present invention.

Examples of such organic materials include chained hydrocarbons such as methane, ethane, ethylene, acetylene, propane, butane, butene, pentane, isobutane, and hexane; cyclic hydrocarbons such as cyclohexane alone or as mixtures; and monocyclic to tricyclic aromatic hydrocarbons such as benzene, toluene, xylene, styrene, ethylbenzene, diphenylmethane, naphthalene, phenol, cresol, nitrobenzene, chlorobenzene, indene, cumarone, pyridine, anthracene, phenanthrene, and mixtures thereof.

Additionally, gas light oils, creosote oils, anthracene oils, naphtha-cracked tar oils, and the like that are produced in the tar distillation process can be used alone or as mixtures.

The amount of the carbon coating is not particularly limited, but is preferably 0.3 to 40% by mass, and more preferably 0.5 to 20% by mass, based on the entire particles coated with the carbon coating.

An amount of the carbon coating of 0.3% by mass or more can maintain a sufficient conductivity, thereby improving the cycle performance when the resulting material is used as a negative electrode material for non-aqueous electrolyte secondary batteries. An amount of the carbon coating of 40% by mass or less can prevent the proportion of carbon in the negative electrode material from becoming excessive, thereby more reliably preventing a decrease in charge/discharge capacity.

The physical properties of the silicon oxide particles coated with the metal oxide coating, and the particles whose surface is coated with the carbon coating, are not particularly limited. However, the mean particle size of these particles is preferably 0.1 to 50 μm; preferably has a lower limit of 0.2 μm or more, and more preferably 0.5 μm or more; and preferably has an upper limit of 30 μm or less, and more preferably 20 μm or less.

A mean particle size of 0.1 μm or more can prevent the proportion of silicon dioxide on the surface of the particles from becoming high because of an increase in specific surface area, thereby minimizing the risk of a decrease in battery capacity when the resulting material is used as a negative electrode material for non-aqueous electrolyte secondary batteries. A mean particle size of 50 μm or less can minimize the risk of degradation in battery characteristics due to the negative electrode material becoming a foreign material when applied to an electrode.

The BET specific surface area of the silicon oxide particles coated with the metal oxide coating, and the particles whose surface is coated with the carbon coating, is preferably 0.5 to 100 $m^2/g$, and more preferably 1 to 20 $m^2/g$.

A BET specific surface area of 0.5 $m^2/g$ or more can prevent a decrease in adhesion when the negative electrode material is applied to an electrode, thereby further reducing the risk of a decrease in battery characteristics. A BET specific surface area of 100 $m^2/g$ or less can prevent the proportion of silicon dioxide on the surface of the particles from becoming high, thereby eliminating the risk of a decrease in battery capacity when the resulting material is used as a negative electrode material for lithium-ion secondary batteries.

As described above, in accordance with the present invention, a negative electrode material that has low surface activity, and can suppress the decomposition of the electrolyte on the surface during charging and discharging, i.e., a negative electrode material for non-aqueous electrolyte secondary batteries that is more resistant to battery expansion and the like than conventional negative electrode materials, and that provides improved cycle performance and increased capacity, can be produced.

Moreover, a lithium-ion secondary battery can be produced by preparing a negative electrode using, as an active material, the composite particles wherein the surface of the silicon oxide particles is coated with the metal oxide.

Note that a conductive agent such as carbon or graphite can be further added when manufacturing a negative electrode.

The type of the conductive agent is not particularly limited; the conductive agent may be any electrically conductive material that does not cause decomposition or deterioration in the constituted battery. Specific examples of usable conductive agents include metal particles or metal fibers of Al, Ti, Fe, Ni, Cu, Zn, Ag, Sn, Si, and the like, natural graphite, synthetic graphite, various types of coke powders, meso-phase carbon, vapor phase grown carbon fibers, pitch base carbon fibers, PAN base carbon fibers, and graphite obtained by firing various resins.

A negative electrode (a molded article) can be prepared by, for example, the following method.

The previously produced negative electrode material, optionally a conductive agent, and other additives such as a binder are mixed with a solvent such as N-methylpyrrolidone or water, to form a pasty mixture, which is applied to a sheet of a collector. Steps such as drying and pressing are subsequently performed, thereby enabling the formation of a negative electrode on the collector.

Any material that is generally used as a collector for negative electrode, such as a copper foil or nickel foil, can be used as the collector, without particular limitations on the thickness and surface treatment.

Note that the method for molding the mixture into a sheet is not particularly limited, and may be a known method.

The above-described lithium-ion secondary battery has a feature in that it uses the negative electrode material of the present invention for non-aqueous electrolyte secondary batteries. Thus, other materials for the positive electrode, negative electrode, electrolyte (electrolyte solution), separator, and the like, as well as the battery shape, etc., are not particularly limited; thus, known materials, battery shapes, etc., can be used.

Examples of usable positive electrode active materials include transition metal oxides such as $LiCoO_2$, $LiNiO_2$, $LiMn_2O_4$, $V_2O_5$, $MnO_2$, $TiS_2$, $MoS_2$, lithium, and chalcogen compounds. Examples of usable electrolytes include non-aqueous solutions containing lithium salts, such as lithium hexafluorophosphate and lithium perchlorate; and examples of usable non-aqueous solvents include one or a combination of two or more from propylene carbonate, ethylene carbonate, diethyl carbonate, dimethoxyethane, γ-butyrolactone, 2-methyl tetrahydrofuran, and the like. Various other non-aqueous electrolytes and solid electrolytes are also usable.

As mentioned above, in accordance with the method of the present invention, a negative electrode material for non-aqueous electrolyte secondary batteries that provides improved safety and cycle performance over conventional negative electrode materials can be produced.

Therefore, a lithium-ion secondary battery using, as the negative electrode, the negative electrode material of the present invention for non-aqueous electrolyte secondary batteries, exhibits improved safety and cycle performance over conventional lithium-ion secondary batteries.

EXAMPLES

Hereinafter, the present invention will be more specially explained by showing Example and Comparative Examples. However, the present invention is not limited to these.

Example 1

Particles having a mean particle size of 5 μm and a BET specific surface area of 3.5 $m^2/g$ in which silicon nanoparticles were dispersed in silicon oxide were prepared. These particles were dried in an electric dryer under nitrogen flow for 6 hours at 120° C. to produce raw material particles [A].

Subsequently, a solution in which 30 g of magnesium diethoxide powder was dissolved in 400 g of dehydrated ethanol was prepared at room temperature, and 100 g of the previously dried raw material particles [A] were gradually added into the solution to prepare a slurry. These operations were performed while passing dry nitrogen through the beaker, in order to prevent moisture in the air from diffusing in the beaker. 5 g of pure water was subsequently added into the slurry with stirring over a period of 10 minutes, and the stirring was continued for 3 hours. The supernatant was then removed, and the mixture was filtered through a Buchner funnel under reduced pressure to give a cake, which was then dried under reduced pressure for 3 hours at 100° C. A powder was thus obtained in an amount of 104 g. ICP analysis of this powder revealed that the powder had a Mg content of 2.3% by mass.

Next, the powder was placed in a batch-type heating furnace. The furnace was heated to 1,000° C. while reducing the pressure in the furnace with an oil-sealed rotary vacuum pump.

$CH_4$ gas was then passed at 1.0 NL/min to perform 5 hours of carbon coating treatment. During the treatment, the pressure was reduced to 200 Pa. After the treatment, the temperature was dropped, 109 g of a black powder was obtained.

The thus-obtained black powder had a mean particle size of 5.2 μm and a BET specific surface area of 4.5 m$^2$/g. As a result of measurement of the amount of carbon using the HORIBA EMIA-110, the powder was found to be a conductive powder containing a carbon coating in an amount of 5.2% by mass based on the black particles. Further, the peak observed by XRD confirmed that Mg was present in the form of MgO. Thus, it was found that the MgO content in the conductive powder was 3.6% by mass.

<Initial Evaluation>

Next, a cell using the obtained powder as a negative electrode active material was evaluated according to the following method (initial evaluation).

85% by mass of the powder was mixed with 15% by mass of a polyimide (U-Varnish A, manufactured by Ube Industries, Ltd.), and N-methylpyrrolidone was further added to the mixture to form a slurry.

The slurry was then applied to a 12 μm thick copper foil, dried for 1 hour at 80° C., and then compression-molded into an electrode using a roller press. The resulting electrode was vacuum-dried for 1 hour at 350° C., and subsequently cut into 2 cm$^2$, thereby preparing a negative electrode.

A lithium-ion secondary cell for evaluation was then fabricated using a lithium foil as a counter electrode; using, as a non-aqueous electrolyte, a non-aqueous electrolyte solution obtained by dissolving lithium hexafluorophosphate in a 1:1 (volume ratio) mixture of ethylene carbonate and diethyl carbonate at a concentration of 1 mol/L; and using a 30 μm thick polyethylene microporous film as a separator.

The thus-fabricated lithium-ion secondary cell was allowed to stand overnight at room temperature, and subjected to a charge/discharge test using secondary battery charge/discharge test equipment (manufactured by Nagano, Co., Ltd.).

Specifically, the test cell was charged at a constant current of 0.5 mA/cm$^2$ until the cell voltage reached 0 V. After the voltage reached 0 V, the test cell was charged at a reduced current so that the cell voltage was maintained at 0 V. When the current value had decreased below 40 μA/cm$^2$, the charging was terminated. The cell was discharged at a constant current of 0.5 mA/cm$^2$, and the discharging was terminated when the cell voltage had reached 1.3 V. The discharge capacity was thus determined. The results are shown in Table 1.

<Cell Evaluation>

Next, an actual cell using lithium cobaltate as the positive electrode was evaluated.

9% by mass of the prepared powder, 81% by mass of synthetic graphite (mean particle size: 10 μm), and 10% by mass of polyimide were mixed, and N-methylpyrrolidone was further added to the mixture to form a slurry.

The slurry was then applied to both surfaces of a 12 μm thick copper foil, dried for 30 minutes at 100° C., and then compression-molded into a 120 μm thick electrode using a roller press. The resulting electrode was vacuum-dried for 2 hours at 400° C., and subsequently cut into a dimension of 5.8 cm in length and 65 cm in width, thereby preparing a negative electrode.

Moreover, 94% by mass of lithium cobaltate, 3% by mass of acetylene black, and 3% by mass of polyvinylidene fluoride were mixed, and N-methylpyrrolidone was further added to the mixture to form a slurry. The slurry was then applied to both surfaces of a 16 μm thick aluminum foil. The applied slurry was subsequently dried for 1 hour at 100° C., and compression-molded into a 140 μm thick electrode using a roller press. The resulting electrode was vacuum-dried for 5 hours at 120° C., and subsequently cut into a dimension of 5.7 cm in length and 59 cm in width, thereby preparing a positive electrode.

A cylindrical lithium-ion secondary cell for evaluation was fabricated using the thus-prepared negative electrode and positive electrode; using, as a non-aqueous electrolyte, a non-aqueous electrolyte solution obtained by dissolving lithium hexafluorophosphate in a 1:1 (volume ratio) mixture of ethylene carbonate and diethyl carbonate at a concentration of 1 mol/L; and using a 20 μm thick polypropylene microporous film as a separator.

The thus-fabricated cylindrical lithium-ion secondary cell was allowed to stand overnight at room temperature, and then charged and discharged using secondary battery charge/discharge test equipment (manufactured by ASKA Electronic Co., Ltd.).

The test cell was first charged at 25° C. and at a constant current of 500 mAh until the cell voltage reached 4.2 V. After the voltage reached 4.2 V, the test cell was charged at a reduced current so that the cell voltage was maintained at 4.2 V. When the current value had decreased below 50 mAh, the charging was terminated. The cell was discharged at a constant current of 500 mAh, and the discharging was terminated when the cell voltage had reached 2.5 V. The charge capacity and discharge capacity were thus determined. The results are also shown in Table 1.

Further, the amount of gas generated inside the cylindrical lithium-ion secondary cell after the charge/discharge test was analyzed.

The analysis of the amount of gas generated was performed as follows: The cell after the charge/discharge test was maintained for 1 hour at 60° C., and then sealed in a gas sampling case with a pressure gauge as shown in FIG. 1. The gas sampling case was made based on Komae Research Laboratory Report No. T99040 (2000), Central Research Institute of Electric Power Industry. The amount of gas generated was evaluated by measuring an increase in pressure when the inside of the cell was released with a needle stuck into the safety valve. The results are also shown in Table 1.

FIG. 1 is now briefly described.

The gas sampling case 10 shown in FIG. 1 includes a case cover 1, a top case portion 3, a middle case portion 4, and a bottom case portion 6. A stainless steel needle 2 is stuck into a cylindrical cell 5 set on the bottom case portion 6, and an increase in pressure inside the case due to the gas generated from the cylindrical cell 5 is evaluated by a manometer 7, which is connected to the middle case portion 4 via a tube 9 and a joint 8.

Example 2

100 g of the raw material particles [A] used in Example 1 were gradually added at room temperature into a 2 L beaker containing 300 g of dehydrated IPA (isopropyl alcohol) to prepare a slurry.

To the slurry was added a mixture of 100 g of dehydrated IPA and 50 g of aluminum tri-sec-butoxide prepared in a separate container, and the mixture was stirred. These operations were performed while passing dry nitrogen through the beaker, in order to prevent moisture in the air from diffusing in the beaker.

10 g of pure water was subsequently added into the slurry with stirring over a period of 10 minutes, and the stirring was continued for 3 hours. The supernatant was then removed, and the mixture was filtered through a Buchner funnel under reduced pressure to give a cake, which was then dried under reduced pressure for 3 hours at 100° C. A powder was thus obtained in an amount of 105 g. ICP analysis of this powder revealed that the powder had an Al content of 2.5% by mass.

This powder was subjected to carbon coating treatment under the same conditions as Example 1.

The resulting black powder was a conductive powder having a weight of 109 g, a mean particle size of 5.3 μm, and a BET specific surface area of 4.7 m$^2$/g, as well as containing a carbon coating in an amount of 4.5% by mass based on the black particles. Further, the XRD peak confirmed that Al was present in the form of α-Al$_2$O$_3$. This revealed that the particles had an Al$_2$O$_3$ content of 4.5% by mass.

The initial evaluation, actual cell evaluation, and evaluation of the amount of gas generated were conducted on the powder, as in Example 1. The results are shown in Table 1.

Example 3

100 g of the raw material particles [A] used in Example 1 were gradually added at room temperature into a 2 L beaker containing 300 g of dehydrated IPA to prepare a slurry.

To the slurry was added a mixture of 100 g of dehydrated IPA and 50 g of titanium isopropoxide prepared in a separate container, and the mixture was stirred. These operations were performed while passing dry nitrogen through the beaker, in order to prevent moisture in the air from diffusing in the beaker.

10 g of pure water was subsequently added into the mixture with stirring over a period of 10 minutes, and the stirring was continued for 3 hours. The supernatant was then removed, and the mixture was filtered through a Buchner funnel under reduced pressure to give a cake, which was then dried under reduced pressure for 3 hours at 100° C. A powder was thus obtained in an amount of 106 g. ICP analysis of this powder revealed that the powder had a Ti content of 3.4% by mass.

This powder was subjected to carbon coating treatment under the same conditions as Example 1.

This resulted in 111 g of a black powder. The black powder was a conductive powder having a mean particle size of 5.2 μm, and a BET specific surface area of 4.5 m$^2$/g, as well as containing a carbon coating in an amount of 5.4% by mass based on the black powder. Further, the peak observed by XRD confirmed that Ti was present in the form of TiO$_2$. This revealed that the particles had a TiO$_2$ content of 5.4% by mass.

The initial evaluation, actual cell evaluation, and evaluation of the amount of gas generated were conducted on the powder, as in Example 1. The results are shown in Table 1.

Example 4

100 g of the raw material particles [A] used in Example 1 were gradually added into a 2 L beaker containing 300 g of dehydrated IPA to prepare a slurry.

To the slurry was added a mixture of 100 g of dehydrated IPA, 38 g of titanium isopropoxide, and 5 g of tetraethyl orthosilicate prepared in a separate container, and the mixture was stirred. To the mixture was further added a solution prepared in a separate container by dissolving 2 g of magnesium diethoxide in 50 g of dehydrated ethanol, and the mixture was stirred. These operations were performed while passing dry nitrogen through the beaker, in order to prevent moisture in the air from diffusing in the beaker.

10 g of pure water was subsequently added into the resulting mixture with stirring over a period of 10 minutes, and the stirring was continued for 3 hours. The supernatant was then removed, and the mixture was filtered through a Buchner funnel under reduced pressure to give a cake, which was then dried under reduced pressure for 3 hours at 100° C. A powder was thus obtained in an amount of 107 g. ICP analysis of this powder revealed that the powder had Ti and Mg contents of 2.5% by mass and 0.2% by mass, respectively, in addition to Si.

This powder was subjected to carbon coating treatment under the same conditions as Example 1.

This resulted in 113 g of a black powder. The resulting black powder was a conductive powder having a mean particle size of 5.2 μm, and a BET specific surface area of 4.5 m$^2$/g, as well as containing a carbon coating in an amount of 5.3% by mass based on the black powder. Further, the peak observed by XRD revealed that the Ti$_{16}$Si$_3$Mg$_2$O$_n$ content was 6.5% by mass.

The initial evaluation, actual cell evaluation, and evaluation of the amount of gas generated were conducted on the powder, as in Example 1. The results are shown in Table 1.

Comparative Example 1

Carbon coating treatment was performed under the same conditions as Example 1, except that the step of forming a metal oxide coating that uses a metal alkoxide on 100 g of the raw material particles [A] used in Example 1 was omitted.

The resulting black powder was a conductive powder having a weight of 106 g, a mean particle size of 5.0 μm, and a BET specific surface area of 4.3 m$^2$/g, as well as containing a carbon coating in an amount of 5.5% by mass based on the black powder.

The initial evaluation, actual cell evaluation, and evaluation of the amount of gas generated were conducted on the powder, as in Example 1. The results are shown in Table 1.

TABLE 1

| | | Metal Oxide Coating Content [% by mass] | Proportion of Carbon Coating [% by mass] | Cell for Initial Evaluation | | Actual Cell | | Gas Pressure in Actual Cell Experiment [kPa] |
| | Type of Metal Oxide Coating | | | Initial Charge Capacity [mAh/g] | Initial Discharge Capacity [mAh/g] | Initial Charge Capacity [mAh/g] | Initial Discharge Capacity [mAh/g] | |
| --- | --- | --- | --- | --- | --- | --- | --- | --- |
| Ex. 1 | MgO | 3.6 | 5.2 | 1643 | 1150 | 2350 | 1590 | 90 |
| Ex. 2 | Al$_2$O$_3$ | 4.5 | 4.5 | 1670 | 1169 | 2300 | 1600 | 84 |
| Ex. 3 | TiO$_2$ | 5.4 | 5.4 | 1645 | 1135 | 2321 | 1601 | 78 |
| Ex. 4 | Ti$_{16}$Si$_3$Mg$_2$O$_n$ | 6.5 | 5.3 | 1687 | 1164 | 2315 | 1600 | 74 |
| Comp. Ex. 1 | None | None | 5.5 | 1710 | 1180 | 2315 | 1574 | 120 |

As shown in Table 1, all of the cells for initial evaluation of Examples 1 to 4 and Comparative Example 1 had initial charge capacities in the range of 1,643 to 1,710 mAh/g, initial discharge capacities in the range of 1,135 to 1,180 mAh/g, and initial charge/discharge efficiencies in the range of 69 to 70%.

Additionally, all of the actual cells of Examples 1 to 4 and Comparative Example 1 had initial charge capacities in the range of 2,300 to 2,350 mAh/g, initial discharge capacities in the range of 1,574 to 1,601 mAh/g, and initial charge/discharge efficiencies in the range of 68 to 70%.

Therefore, there were no significant differences in initial charge/discharge characteristics between the cells for initial evaluation and actual cells of Examples 1 to 4 and those of Comparative Example 1.

However, the pressure of the gas generated by the decomposition of the electrolyte in the actual cell experiments was 90 kPa in Example 1, 84 kPa in Example 2, 78 kPa in Example 3, and 74 kPa in Example 4. In contrast, it was found that the gas pressure was 120 kPa for the actual cell of Comparative Example 1, and hence, a greater amount of gas was generated inside the cell, as compared to the actual cells of Examples 1 to 4 using the negative electrode materials coated with a metal oxide coating.

The foregoing results revealed that the provision of a metal oxide coating can reduce the amount of gas generated (i.e., suppress the decomposition of the electrolyte), and, by extension, can improve the cycle performance, while hardly reducing the charge and discharge capacities. This proved that negative electrode materials suitable for non-aqueous electrolyte secondary batteries that provide increased safety and capacity were produced.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A negative electrode material for non-aqueous electrolyte secondary batteries, comprising:
    silicon oxide particles comprising silicon oxide with silicon nanoparticles dispersed within the silicon oxide;
    a metal oxide coating formed on a surface of the silicon oxide particles; and
    a carbon coating formed on a surface of the metal oxide coating,
    wherein the metal oxide coating comprises an oxide of one or two elements selected from the group consisting of magnesium (Mg), and aluminum (Al), and
    wherein the metal oxide coating formed on the surface of the silicon oxide particles is present in a proportion of 0.1% by mass or more and 30% by mass or less based on the total mass of the silicon oxide particles.

2. The negative electrode material for non-aqueous electrolyte secondary batteries according to claim 1, wherein the metal oxide coating further comprises, as a constitutional element, at least one element selected from the group consisting of zirconium (Zr), hafnium (Hf), vanadium (V), niobium (Nb), tantalum (Ta), chromium (Cr), molybdenum (Mo), tungsten (W), manganese (Mn), iron (Fe), ruthenium (Ru), cobalt (Co), rhodium (Rh), iridium (Ir), nickel (Ni), palladium (Pd), cerium (Ce), indium (In), germanium (Ge), tin (Sn), bismuth (Bi), antimony (Sb), cadmium (Cd), copper (Cu), and silver (Ag).

3. A lithium-ion secondary battery comprising at least a positive electrode, a negative electrode, and a lithium-ion conducting non-aqueous electrolyte, the battery comprising, as the negative electrode, the negative electrode material for non-aqueous electrolyte secondary batteries according to claim 1.

* * * * *